July 8, 1958  M. KOK  2,841,977
WELDING AND ASSEMBLING FLOOR
Filed July 13, 1953  3 Sheets-Sheet 1
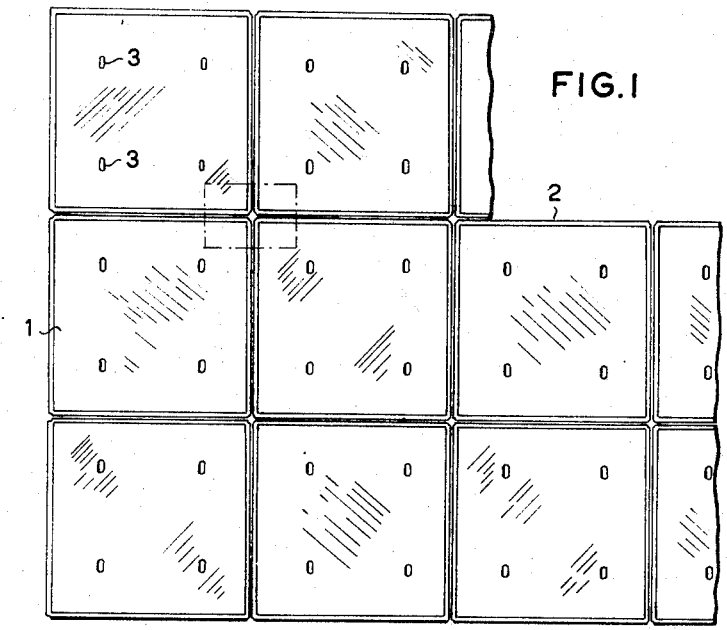
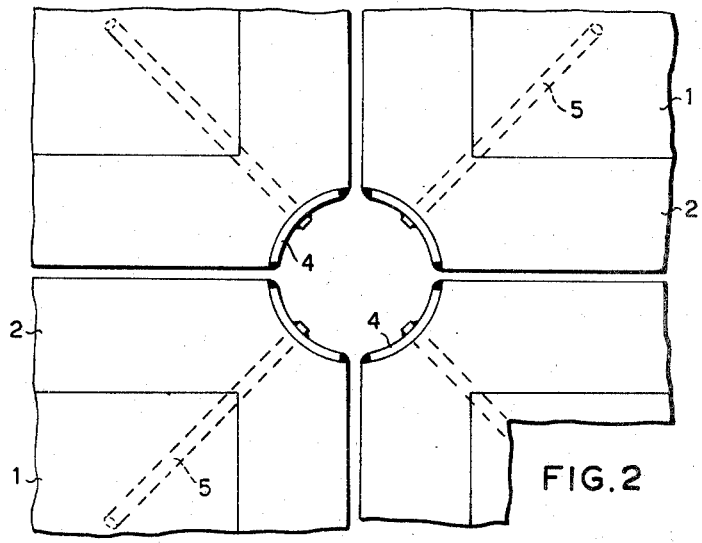
INVENTOR
Marinus Kok
BY A. J. Michel
ATTORNEY July 8, 1958  M. KOK  2,841,977
WELDING AND ASSEMBLING FLOOR
Filed July 13, 1953  3 Sheets-Sheet 2

INVENTOR
Marinus Kok
BY
ATTORNEY

July 8, 1958 M. KOK 2,841,977
WELDING AND ASSEMBLING FLOOR
Filed July 13, 1953 3 Sheets-Sheet 3

INVENTOR
Marinus Kok
BY
ATTORNEY

United States Patent Office 2,841,977
Patented July 8, 1958

2,841,977

WELDING AND ASSEMBLING FLOOR

Marinus Kok, De Steeg, Netherlands, assignor to N. V. Betonfabriek "De Meteoor," De Steeg, Rheden, Netherlands, a limited-liability company of the Netherlands Application July 13, 1953, Serial No. 367,570

Claims priority, application Netherlands July 12, 1952

3 Claims. (Cl. 72—68)

When building ships, it is usual to place the sheets of a ship hull on the ground of the shipyard and to weld them together before they are secured to the frame. For this welding operation use is made of a welding floor consisting of heavy I-beams of a height of 16 to 20 in. the lower half of which is sunk into a concrete floor while the upper flanges are in the same horizontal plane, so that the sheets may be laid thereon. In order to push said sheets, which have a considerable weight, against each other, use is made of screw jacks which find a point of support against one of the I-beams. Thereupon the adjoining sheets are clamped against the upper flanges of the I-beams by means of screw clips which grip around the upper flanges of the I-beams and around the edge portions of the sheets.

The known welding floors described hereabove are very expensive, not only because the concrete floor must have a thickness of at least 40 cm. (16 in.), but moreover the price of I-beams of such a heavy section is very high. Further a monolith floor must be mounted on piles since otherwise the floor would crack due to heavy local loads. Another drawback is this that the welding floor above which the upper half of the I-beams extend in parallel direction, is not suitable for other kind of work since it is not possible to drive with trucks or other vehicles on such a floor.

The purpose of the present invention is to provide a welding and assembling floor which has none of these drawbacks and which can also be used for other assembling work. According to the invention the floor is provided with devices adapted to receive elements serving as counter-supports for large horizontal forces in any direction.

According to the invention the floor may be composed of rectangular rafts or slabs having at their corners a member of about the shape of a quarter of a cylinder, which together with similar members of other rafts or slabs delimit a cylindrical space for receiving a sleeve into which a pin or other element may be inserted serving as a counter-support for the said horizontal forces.

According to a further feature of the invention said quarter-cylindrical members arranged at the corners of the rafts or slabs are provided with one or more projections forming an abutment for said sleeve.

According to still a further feature of the invention said projections are constituted by anchors which are welded to said quarter-cylindrical members, the ends of said anchors extend into the cylindrical space delimited by said members.

According to still a further feature of the invention said sleeve is provided with four radial wings which extend between adjacent rafts or slabs.

The floor according to the invention has many advantages. It is preferred to compose the floor of concrete rafts or slabs with reinforced edges measuring e. g. 2 x 2 m. (about 80 x 80 in.). Due to the fact that the sleeves for receiving the pins as counter-supports for horizontal forces are flush with the floor, it is possible to drive over the floor even with heavy lifting trucks and other vehicles which is of great advantage in assembling and other work. Moreover, a welding and assembling floor according to the invention is much cheaper than the above-described known welding fioor with heavy I-beams embedded therein. A floor composed of rafts or slabs does not need a support by pile-work since in case of a large local stress, e. g., by a heavy vehicle driving over the floor, the rafts or slabs are adapted to follow the yielding of the ground without danger for cracking.

Reference is made to the enclosed drawings which show a floor according to the invention. In the drawings:

Fig. 1 is a plan view of a portion of a floor according to the invention,

Fig. 2 is a plan view of a portion of Fig. 1 indicated by a dot-and-dash line, however without the sleeve.

Figure 5:
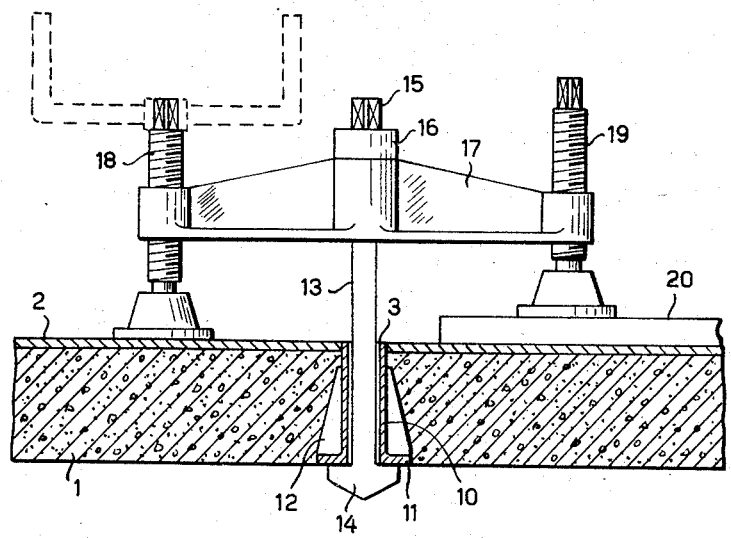

The floor shown in the drawings is composed of square concrete rafts or slabs 1, which are provided with an edge reinforcement 2 formed by angle section and which have a dimension of 2 x 2 m. (about 80 x 80 in.). Each raft or slab has four non-circular apertures 3 arranged at a distance of one meter (40 in) from each other and at a distance of 0.5 m. (20 in.) from the sides. The corners of the rafts or slabs are not sharp but are provided with members 4 in the shape of about a quarter of a cylinder. These members are welded to the horizontal web and to the vertical web of an L-shaped edge reinforcement 2. At each corner of the raft or slab an anchor 5 is embedded in the concrete and is welded in a recess in the lower end of the member 4. One end of the anchor 5 extends over a short distance within the cylindrical space delimited by the members 4, so that the lower edge of a cylindrical sleeve 6 inserted in said space will find an abutment. The abutments may also be formed, instead of by the projecting ends of the anchors 5, by incising the members 4 and bending a portion thereof towards the cylindrical space so that the sleeve 6 may rest thereon.

Figure 3:
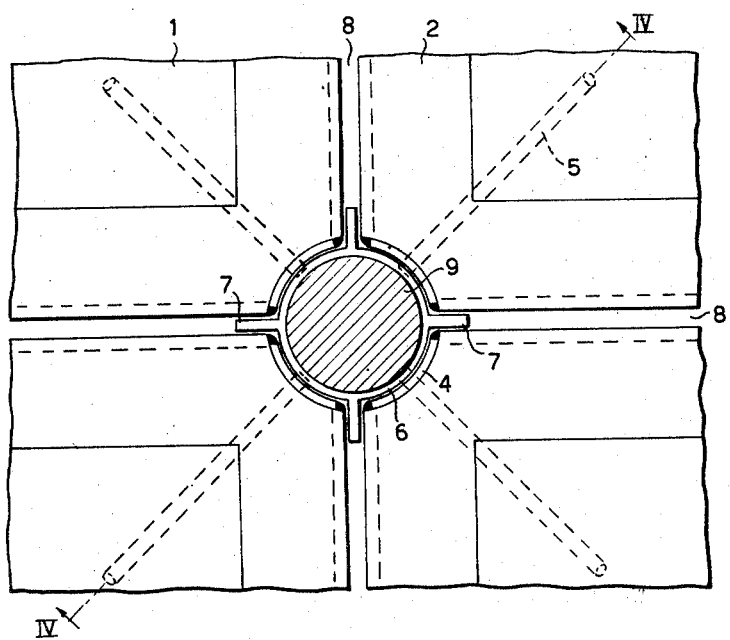
Fig. 3 is a plan view corresponding with Fig. 2, however with a sleeve mounted therein and a pin inserted in said sleeve shown in section.
Figure 4:
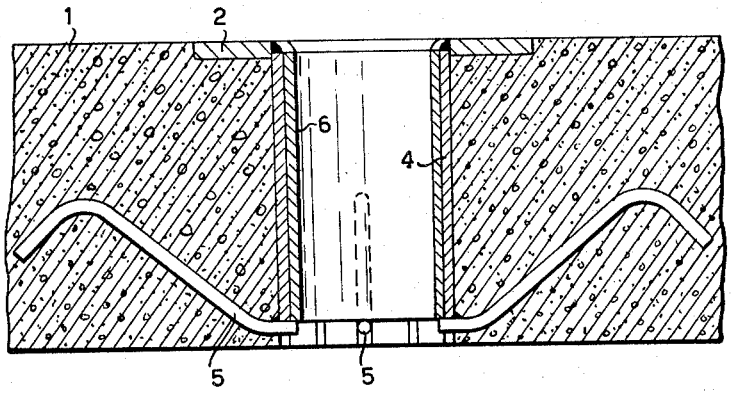
Fig. 4 is a vertical section according to the line IV—IV in Fig. 3 however without the pin.

As is shown in Fig. 3 the sleeve 6 is provided with four radial wings 7 which extend between two adjacent rafts or slabs so that a narrow joint 8 is left open between the rafts or slabs. A heavy solid pin 9 may be inserted into the sleeve 6, said pin extending above the floor and serving as a counter-support for a horizontal screw jack by means of which a metal sheet laid on the floor, may be shifted until its edge abuts against the edge of another sheet.

The wings 7 of the sleeve 6 have the advantage that if the members 4 must take horizontal forces, the whole floor composed of the rafts or slabs 1 receives these forces since the rafts or slabs cannot be moved away. Further, the free joints 8 prevent the rafts or slabs from being laid or shifted too tightly one against another so that there will be no difficulty when hoisting a raft or slab from the floor which might be necessary for removing and laying again a sagged or damaged raft or slab.

It follows from the above that the floor according to the invention enables the use of devices for exerting large horizontal forces finding an abutment against the pin 9.

What is claimed is:

1. A floor comprising at least four aligned rectangular concrete slabs, the four corners of each slab consisting of approximately quarter-cylindrical grooves, a reinforcing metal frame around the top edge of each slab, a metal member having approximately the shape of a quarter cylinder lining each of said grooves and being integral with said frame, an upper end of each metal member being flush with the frame, four adjacent ones of said quarter-cylindrical metal members forming a substantially cylindrical bore in the floor, a cylindrical sleeve removably fitted in said bore, and abutment means projecting into said bore to support the cylindrical sleeve.

2. A floor comprising at least four aligned rectangular concrete slabs, adjacent ones of said slabs defining narrow channel joints therebetween and the four corners of each slab consisting of approximately quarter-cylindrical grooves, a reinforcing metal frame around the top edge of each slab, a metal member having approximately the shape of a quarter cylinder lining each of said grooves and being integral with said frame, an upper end of each metal member being flush with the frame, four adjacent ones of said quarter-cylindrical metal members forming a substantially cylindrical bore in the floor, each of said bores in the floor interconnecting four adjoining ones of said channel joints, a cylindrical sleeve removably fitted in said bore, each sleeve having four radial wings extending and fitted into said adjoining channel joints, and abutment means projecting into said bore to support the cylindrical sleeve.

3. The floor of claim 2, comprising anchors embedded in the concrete and fixedly connected to said quarter-cylindrical metal members, the ends of said anchors projecting into said bores to form the abutment means for the cylindrical sleeves.

References Cited in the file of this patent

UNITED STATES PATENTS

| 992,739 | Meier | May 16, 1911 |
| 1,813,909 | Brainard et al. | July 14, 1931 |
| 1,998,448 | Crowe | Apr. 23, 1935 |
| 2,031,684 | Berger | Feb. 25, 1936 |
| 2,091,061 | Waugh | Aug. 24, 1937 |
| 2,273,775 | Strong | Feb. 17, 1942 |
| 2,527,985 | Burroway | Oct. 31, 1950 |
| 2,537,715 | Stead | Jan. 9, 1951 |
| 2,577,323 | Goenner | Dec. 4, 1951 |
| 2,618,960 | Orzel | Nov. 25, 1952 |

FOREIGN PATENTS

| 923,356 | France | Feb. 17, 1947 |